United States Patent [19]
Hardesty

[11] Patent Number: 5,544,990
[45] Date of Patent: Aug. 13, 1996

[54] TOOLHEAD MOUNTING ASSEMBLY

[75] Inventor: Michael P. Hardesty, Dale, Ind.

[73] Assignee: Thermwood Corporation, Dale, Ind.

[21] Appl. No.: 295,258

[22] Filed: Aug. 24, 1994

[51] Int. Cl.⁶ .................................................. B23Q 1/26
[52] U.S. Cl. ........................... 409/183; 384/42; 408/234; 409/235
[58] Field of Search ...................... 408/88, 234; 409/183, 409/185, 235; 384/39, 40, 42, 907, 908, 909

[56] References Cited

U.S. PATENT DOCUMENTS

| | | | |
|---|---|---|---|
| 3,054,645 | 9/1962 | Evans | 384/42 |
| 3,212,827 | 10/1965 | Brettrager | 384/40 |
| 3,350,143 | 10/1967 | Lichowsky | 384/42 |
| 4,773,769 | 9/1988 | Church | 384/40 |
| 4,978,233 | 12/1990 | Stotzel | 384/42 |
| 5,096,348 | 3/1992 | Winkler | 409/235 |

*Primary Examiner*—Daniel W. Howell
*Attorney, Agent, or Firm*—Lalos & Keegan

[57] ABSTRACT

A toolhead mounting assembly for a machine tool generally consisting of a support plate member mountable on a component of the machine tool, a mounting plate member having means for mounting a toolhead unit thereon, one of the plate member having a pair of parallel guide slots each provided with a lining of a stuctural polymer material, and the other of the plate materials having edges received within the guide slots in sliding engagement with such linings to permit displacement of the mounting plate member relative to the support plate member and means for displacing the mounting plate member relative to the support plate member along a line of travel parallel to the guide slots.

9 Claims, 4 Drawing Sheets 5,544,990

TOOLHEAD MOUNTING ASSEMBLY

This invention relates to a toolhead assembly for a machine tool and more particularly to an assembly for mounting a toolhead on a carriage or other component of a machine tool.

A type of machine widely used in the wordworking, plastic and aerospace industries for making a wide variety of products such as furniture parts, plastic components, aircraft parts and the like, generally consists of a base member provided with a worktable upon which one or more workpieces may be positioned to be machined, and a number of carriages supported on the base member for displacing a tool of a toolhead assembly along a longitudinal line of travel or x-axis, a transverse line of travel or y-axis and a vertical line or travel or z-axis, in accordance with a program inputted or loaded into a controller which operates the machine. Typically, such carriages are supported on trackways and are displaced along such axes by means of drive or feed screws.

The trackways of such machines usually are formed of steel which are precision machined to be true along their lengths, hardened to provide wear resistant surfaces for carrying static and dynamic loads and ground to provide finished bearing surfaces. Normally, the displaceable carriages of such machines are provided with intricate ball bearings which are seated and ride upon the various trackways of such machines.

Although such trackway and ball bearing arrangements are reliable and highly efficient and effective in use, and particularly effective in rapidly and precisely positioning the tools of such machines in response to controller commands, they have been found to be very expensive to manufacture and install thereby substantially increasing the cost of such machines. The size and nature of material of such components further presents a weight problem, particularly for the toolhead mounting assembly requiring larger motors to drive supporting carriages. It thus has been found to be desirable to provide an improved toolhead mounting assembly for a machine tool of the type described which may be responsively and easily displaced along the z-axis of the machine tool, provide a minimal amount of mass to be displaced and which is relatively simple and comparatively inexpensive to manufacture.

Accordingly, the principal object of the present invention is to provide an improved toolhead mounting assembly for a machine tool.

Another object of the present invention is to provide an improved toolhead mounting assembly for a machine tool which eliminates the use of conventional trackway and ball bearing arrangements for supporting and guiding the toolhead mounting assembly relative to a supporting component of the machine.

A further object of the present invention is to provide an improved toolhead mounting assembly for a machine tool having improved mounting means providing a comparatively smaller mass than conventional mounting means.

A still further object of the present invention is to provide an improved toolhead mounting assembly for a machine tool capable of positioning a tool along longitudinal, transverse and vertical axes for performing a work function on a workpiece positioned thereon.

Another object of the present invention is to provide an improved toolhead mounting assembly for a computer controlled machine tool which is effective to rapidly and precisely displace a tool such as a drill, router, sander, saw and the like along a vertical or z-axis in response to command signals generated by a controller operating the machine, A further object of the present invention is to provide an improved toolhead mounting assembly for a machine tool which is relatively simple in design, comparatively inexpensive to manufacture, highly effective inperformance and simple to service.

Other objects and advantages of the present invention will become more apparent to those persons having ordinary skill in the art to which the present invention pertains from the following description taken in conjunction with the accompanying drawings wherein.

Figure 1:
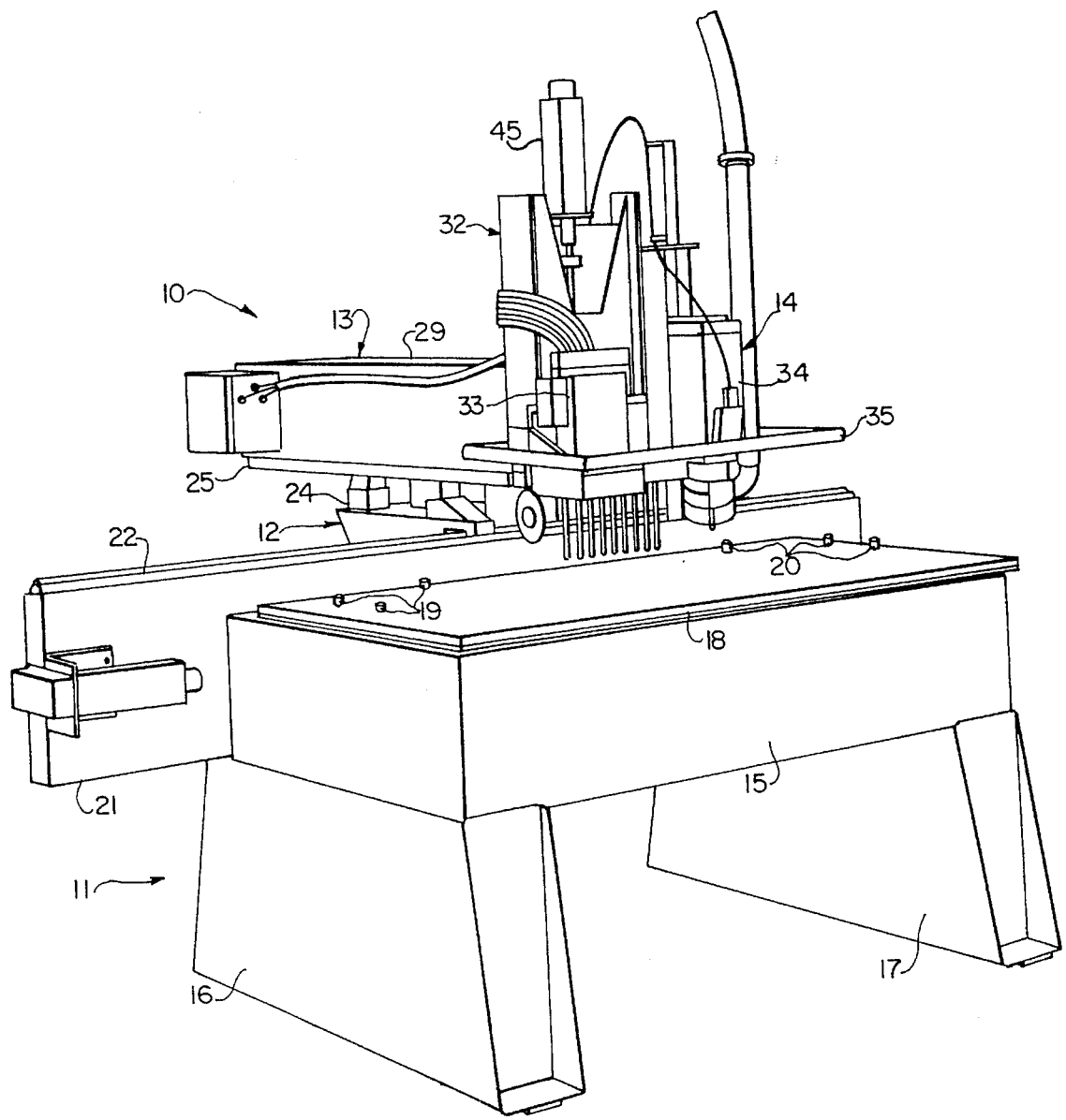
FIG. 1 is a perspective view of a machine tool provided with a toolhead mounting assembly embodying the present invention.

Referring to FIG. 1, there is shown a machine tool 10 having a toolhead mounting assembly embodying the present invention. The machine is adapted to support one or more workpieces and to select and displace one of a number of tools longitudinally or along an x-axis, transversely or along a y-axis and vertically or along a z-axis, in accordance with a particular program inputted or loaded into a controller which operates the machine, to perform various selective work functions such as drilling, countersinking, chamfering, routing, sanding, sawing and the like on workpieces supported on the machine. Generally, the machine consists of a base member 11, a transversely displaceable carriage assembly 12 mounted on the base member, a longitudinally displaceable carriage member 13 mounted on carriage assembly 12 and a vertically displaceable toolhead assembly 14 mounted on carriage assembly 13.

Base member 11 includes a horizontally disposed main body section 15 supported on a pair of leg sections 16 and 17. Mounted on base section 15 is a worktable 18 on which one or more workpieces to be machined may be placed. The worktable is provided with sets of pins 19 and 20 which may be used to position various panel-shaped workpieces on the worktable to be machined. Various means including clamping devices and vacuum systems may be used to secure the workpieces in position on the worktable during the machining operations.

Mounted on the rear side of base section 15 and rigidly secured thereto by welding is a vertically disposed, transversely extending beam section 21. As shown in FIG. 1, beam section 21 has a transverse length greater than the transverse length of base section 15 so that the end portions of beam section 21 project laterally relative to the sides of base section 15. Mounted on the upper edge of beam section 21 is a trackway 22. A similar trackway 23 is provided on the rear side of beam section 21 adjacent the lower edge thereof.

Carriage assembly 12 includes a base member 24 mounted on beam section 21 and a longitudinally disposed platform member 25. Base member 24 is provided with sets of ball bearings 26 and 27 which are mounted and ride on transversely disposed trackways 22 and 23, respectively, and is adapted to displace transversely along the y-axis by means of a drive or feed screw mounted on beam section 21, driven by a motor 28 operated by the controller and cooperating with a follower provided on base member 24. Platform member 25 is provided with a pair of longitudinally disposed trackways on which carriage assembly 13 is mounted.

Carriage assembly 13 includes a longitudinally disposed ram section 29 supported on platform member 25 of carriage assembly 12, and a vertically disposed support plate member 30 mounted on the front end of member 29. Ram section 29 is provided with a set of ball bearings which are mounted and ride on the longitudinally displaced trackways on platform 25, and is adapted to be displaced longitudinally along the x-axis by a drive or feed screw 31 mounted on platform member 25, driven by a motor mounted on member 29 and operated by the controller, and cooperating with a follower on member 24.

Toolhead assembly 14 generally includes a mounting plate member 32 supported on support plate member 30 for vertical displacement relative thereto, a toolhead unit 33 mounted on the mounting plate member and a router unit 34 also mounted on the mounting plate member 32. Mounting plate member 32 is adapted to be mounted for displacement vertically relative to support plate member 30 in a manner to be hereinafter described. Toolhead unit 29 and router unit 30 are rigidly mounted on mounting plate member 32 so that such units will be displaced vertically with the mounting plate member relative to support plate member 30. The toolhead assembly further is provided with a guard rail 35 which encompasses the toolhead and router units for protection purposes and which further may be grasped and moved by an operator to manually displace the toolhead assembly.

Figure 2:
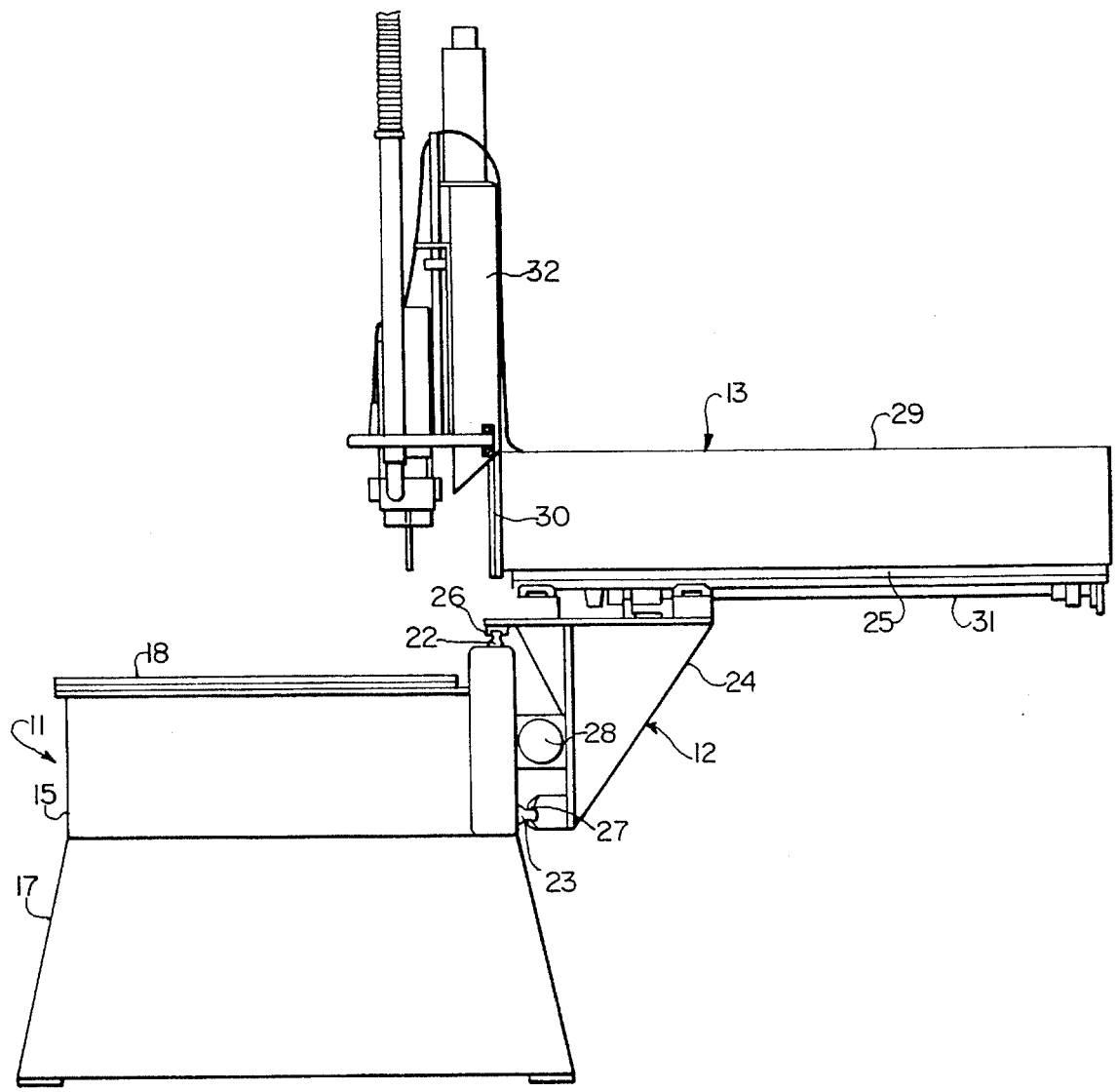
FIG. 2 is a side elevational view of the machine shown in FIG. 1.
Figure 3:
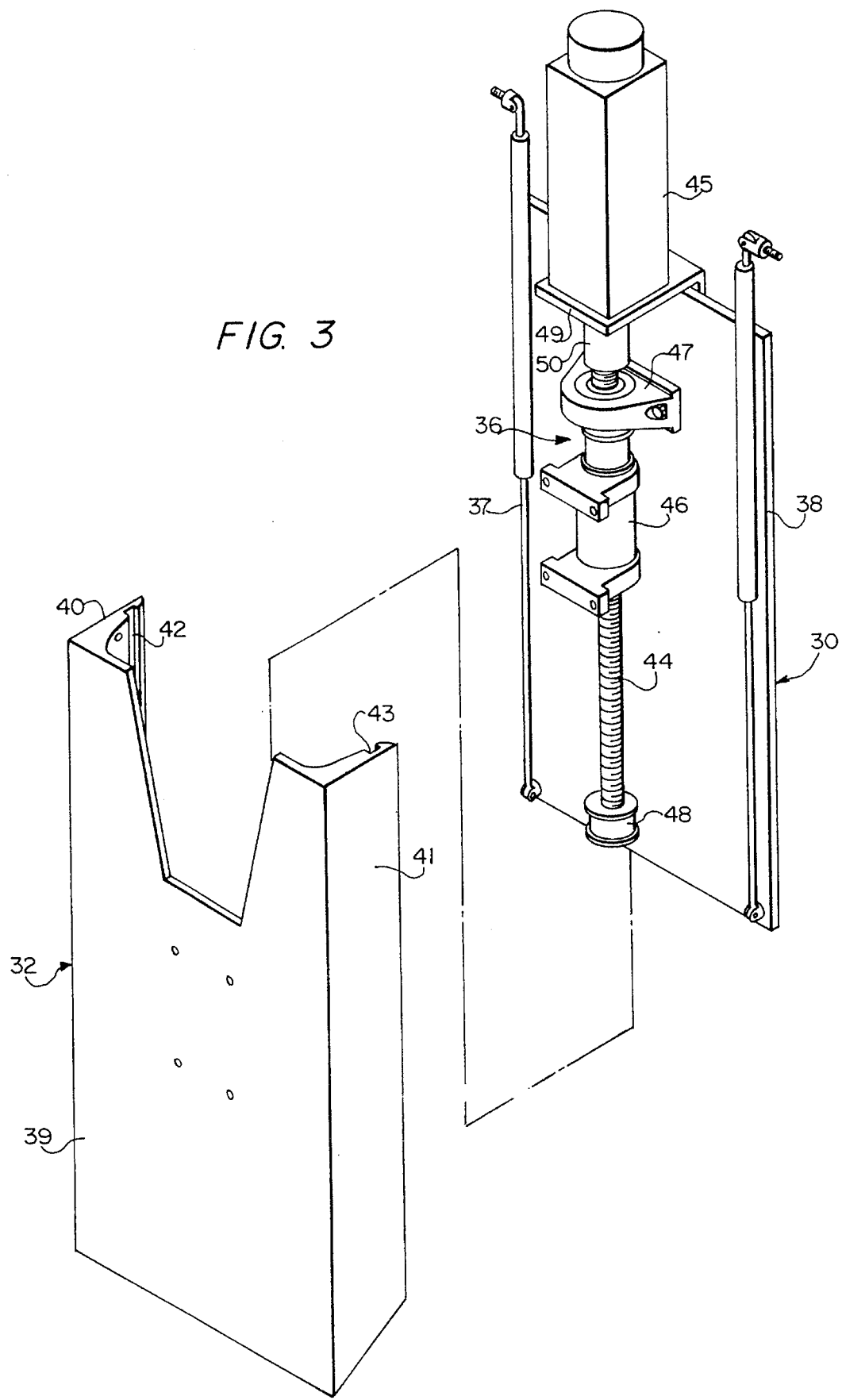
FIG. 3 is an enlarged perspective view of the toolhead mounting assembly shown in FIGS. 1 and 2, illustrating some of the components thereof in exploded relation.
Figure 5:
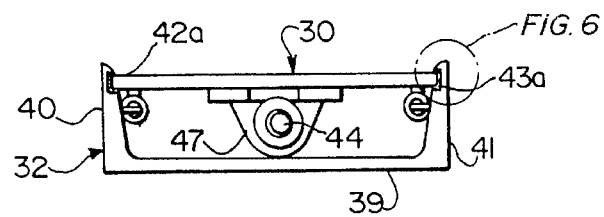
FIG. 5 is a top plan view of the toolhead mounting assembly shown in FIGS. 1 through 4, having the drive motor thereof removed.
Figure 6:
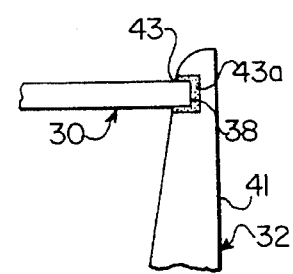
FIG. 6 is an elarged view of the area designated FIG. 6 in FIG. 5.

The toolhead mounting assembly embodying the present invention is best illustrated in FIGS. 3, 5 and 6 and includes support plate member 30, mounting plate member 32 and a drive assembly 36. As previously mentioned, support plate member 30 is rigidly secured to the front end of ram member 29 and is provided with a pair of parallel side edges 37 and 38. Mounting plate member 32 has a channel-shaped configuration including a base plate section 39 and a pair of flange sections 40 and 41. The flange sections are provided with a pair of opposed, parallel guide slots 42 and 43 which are adapted to receive side edges 37 and 38 therein to permit mounting plate member 32 to be displaced relative to support plate member 30. As best shown in FIGS. 5 and 6, guide slots 42 and 43 are provided with linings 42a and 43a formed of a structural polymer material which provide bearing surfaces for the side edges of support plate member 30. The structural polymer of which such linings are formed preferably is an epoxy-based structural polymer having a low coefficient of friction, high wear properties, low abrasion rates, a high compression strength and long term dimensional stability to provide a finished bearing surface for the support plate member. A suitable structural polymer for such purpose has been found to be a polymer manufactured and sold by Diamant Metallplastic GmbH of Monchengladbach, Germany, under the trademark MOGLICE. As shown in FIGS. 1 and 2, toolhead unit 33 and router unit 34 may be mounted on base plate section 39 in the conventional manner.

Drive assembly 36 generally includes a drive or feed screw 44, a drive motor 45 and a ball follower 46. The drive screw is journalled in a set of bearings 47 and 48 rigidly secured to support plate member 30. Drive motor 45 is supported on a mounting bracket 49 secured to support plate member 30 and has a downwardly extending output shaft operatively connected to an upper end of drive screw 44 through a coupler 50. Follower 46 is rigidly secured on the inner side of base plate section 39 and is of a conventinal construction cooperating with drive screw 44 upon energization of motor 45 to displace mounting plate member 32 relative to support plate member 30 as the mounting plate member is guided vertically by means of the side edges 37 and 38 of the support plate member being received within guide slots 42 and 43 of the mounting plate member.

Support plate member 30 may be formed of any plate material having sufficient strength characteristics, including steel and aluminum. Mounting plate member 39 also may be formed of any sturdy material such as steel or aluminum, and can be of a cast or fabricated construction with slots 42 and 41 being formed either by casting or machining. Preferably, however, mounting plate member 32 is of an aluminum cast construction with guide slots 42 and 43 being roughly formed by casting.

Linings 42a and 43b which serve as bearing surfaces for side edges 37 and 38 of support plate member 30 are formed by applying a mold release agent along the side edges of the support plate member, positioning the support plate member relative to the mounting plate member with side edges 37 and 38 of the support plate member being received within guide slots 42 and 43 and spaced from the bottom and sidewall surfaces of the slots to provide substantially U-shaped spaces therebetween, pouring or otherwise injecting an uncured formulation of the structural polymer within the U-shaped spaces between the edges of the support plate member and the slot wall surfaces of the mounting plate member, and then allowing the formulation of structural polymer to cure and harden. Upon curing and setting, the structural polymer will provide bearing surfaces replicating the side edges of the support plate member. The polymer will permanently adhere to the side wall surfaces of slots 42 and 43 but will not adhere to the side edges of the support plate member by reason of the use of the mold release agent. The support plate member would then be free to be displaced relative to the mounting plate member, guided along the bearing surfaces of the structural polymer linings 42a and 43a.

The material forming the bearing linings preferably is an epoxy-based structural polymer which may be used in the form of a fluid having the consistency of gear oil or in the form of a putty. The material preferably is used in the form of a liquid and is injected into lower areas of the guide slots to force out the air in the space between the edges of the support plate member and the bottom and side wall surfaces of the guide slots thus preventing any air pockets or voids along the edges of the support plate member, and precisely replicate the surfaces of the side edges of the support plate member. Upon the curing and setting of the polymer, there will be provided a pair of guide slots replicating the side edges of the support plate member, having the structural integrity and dimensional stability of machined metallic surfaces. To enhance the lubricity of the polymer linings in the guide slots, the structural polymer used may be formulated with a lubricant such as molybdenum disulfide.

Figure 4:
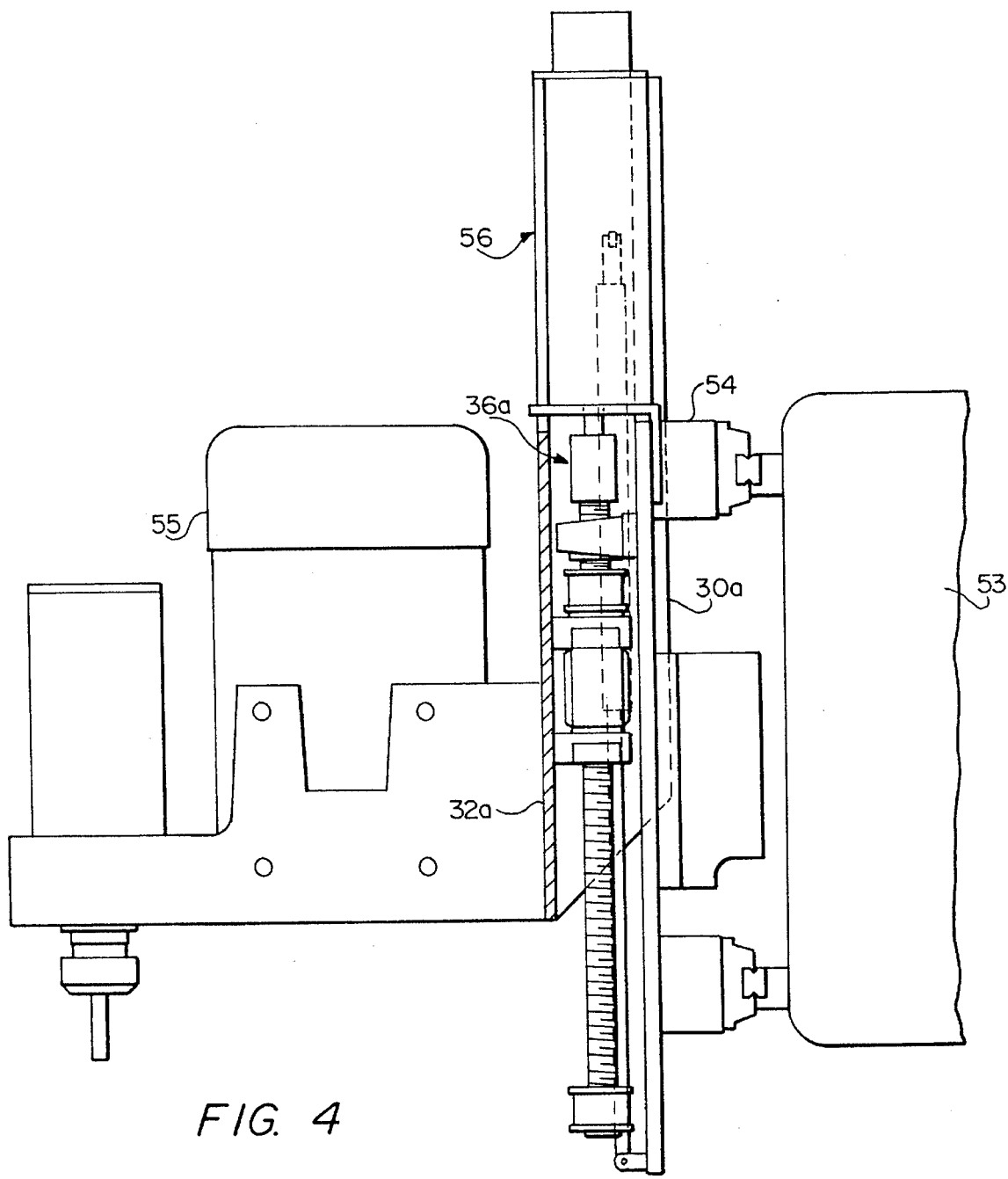
FIG. 4 is a side elevational view of the toolhead mounting assembly illustrated in FIG. 3, in which the assembly is shown mounted on a bridge member of a machine for displacement relative thereto along a transverse or y-axis.

Although the invention has been described for use in connection with the type of machine tool shown in FIGS. 1 and 2, it is contemplated that the invention also can be used with other types of machines utilizing various types of components for displacing a working tool along x, y and z axes. Another of such machines with which the present invention may be used is partially shown in FIG. 4. In such a machine which is widely used in the wordworking, plastics and aerospace industries, there is provided a base member having a worktable on which one or more workpieces may be positioned to be machined, a bridge or gantry member supported on the base member and displaceable longitudinally or along the x-axis relative to the base member, such as bridge member 53 shown in FIG. 4, a toolhead support assembly mounted on the bridge or gantry member and displaceable transversely or along the y-axis, such as assembly 54 shown in FIG. 4, and a toolhead assembly mounted on the toolhead support assembly and displaceable vertically or along a z-axis, such as toolhead assembly 55 shown in FIG. 4. In such a machine, as shown in FIG. 4, there is provided a toolhead mounting assembly 56 comparable to the assembly shown in FIGS. 3, 5 and 6 for mounting the toolhead assembly on the toolhead support assembly. Toolhead mounting assembly 56 includes a base plate member 30a comparable to base plate member 30, a mounting plate member 32a comparable to mounting plate member 32 and a drive assembly 36a comparable to drive assembly 36 as shown in FIG. 3.

The toolhead mounting assembly as described, embodying the present invention, further may be utilized in a modification of the type of machine described in connection with the machine partially illustrated in FIG. 4. In such modification, the bridge or gantry member is stationary and rigidly secured to the base member of the machine and the worktable on which the workpieces to be machined are positioned, is adapted to be displaced relative to the base and bridge members longitudinally along the x-axis. In such modified form of machine, the base plate member of the toolhead mounting assembly would be rigidly secured to the stationary bridge or gantry member and the mounting plate member would be connected to the support plate member in the manner as previously described to permit displacement of the mounting plate member with the toolhead unit rigidly secured thereto vertically or along the x-axis relative to the stationary support plate member.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

I claim:

1. A toolhead mounting assembly for a machine tool comprising:

a support plate member mountable on a component of said machine tool;

a mounting plate member having means for mounting a toolhead unit thereon;

one of said plate members having a pair of parallel guide slots each provided with a lining of a structural polymer material and the other of said plate members having edges received within said guide slots in sliding engagement with said lining to permit displacement of said mounting plate member relative to said support plate member;

means for displacing said mounting plate member relative to said support plate member along a line of travel parallel to said guide slots; and wherein each of said guide slots includes a bottom wall surface and a pair of opposed side wall surfaces provided with said lining of structural polymer material.

2. An assembly according to claim 1, wherein said linings are formed of an epoxy-based structural polymer.

3. An assembly according to claim 1, wherein said linings are formed of a structural polymer having a low coefficient of friction, high wear properties and long term dimensional stability.

4. An assembly according to claim 1, wherein said structural polymer is formulated with a lubricant.

5. An assembly according to claim 4, wherein said lubricant is molybdenum disulfide.

6. An assembly according to claim 1, wherein said mounting plate member is provided with a pair of opposed slots provided with said linings and said mounting plate member is provided with a pair of edges received in said guide slots.

7. An assembly according to claim 1, wherein said mounting plate member has a channel-shaped configuration including a base section and a pair of flange sections, said flange sections are provided with a pair of opposed, parallel guide slots provided with said linings and said support plate member is provided with a pair of edges received in said guide slots.

8. An assembly according to claim 1, wherein said displacing means operatively interconnects said plate members.

9. An assembly according to claim 1, wherein said displacing means includes a drive screw journaled in one of said plate members, driven by a motor mounted on said plate member, and a follower member mounted on the other of said plate members and operatively connected to said drive screw.

* * * * *